March 30, 1926.
C. A. REED
FLUID DISTRIBUTOR
Filed August 18, 1925
1,578,758
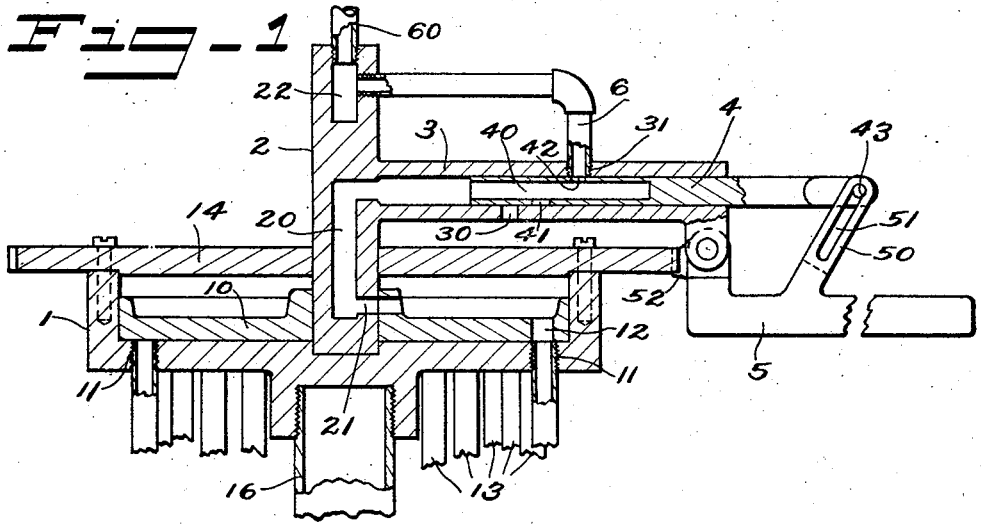
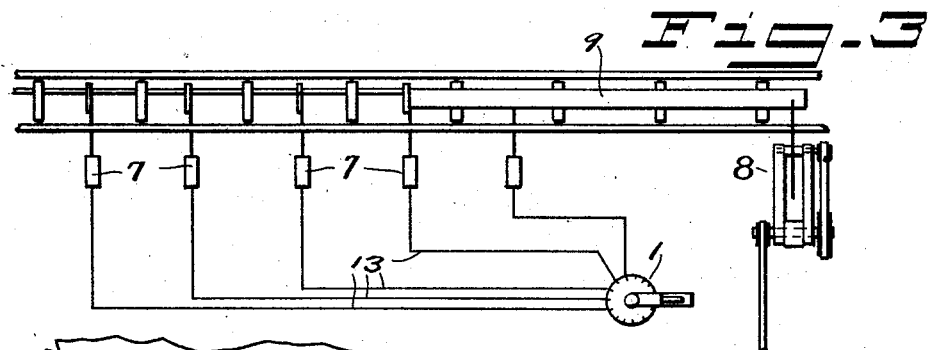
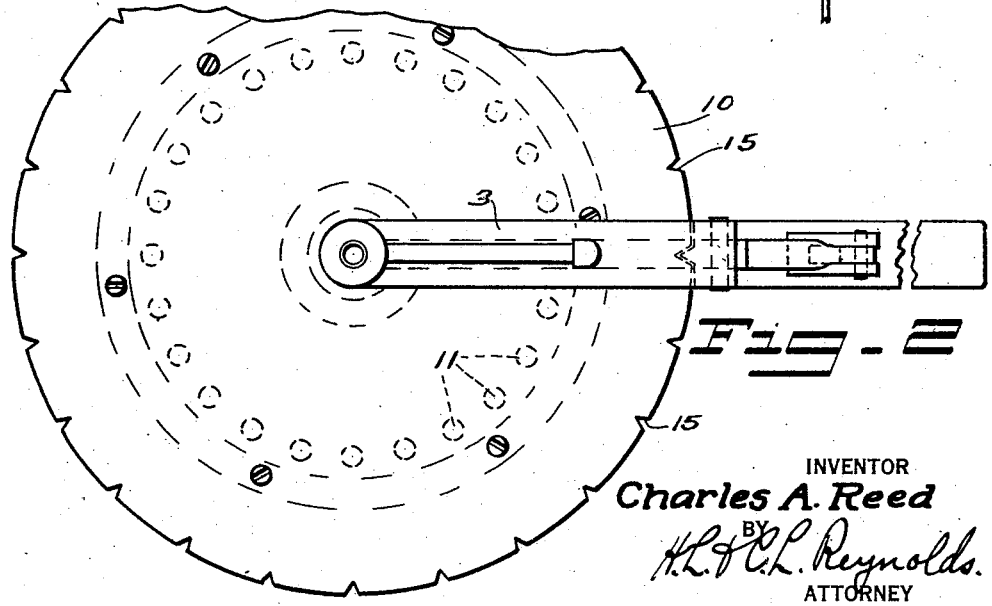
INVENTOR
Charles A. Reed
BY
H.L. & C.L. Reynolds.
ATTORNEY Patented Mar. 30, 1926.

1,578,758

UNITED STATES PATENT OFFICE.

CHARLES A. REED, OF ONALASKA, WASHINGTON.

FLUID DISTRIBUTOR.

Application filed August 18, 1925. Serial No. 51,033.

*To all whom it may concern:*

Be it known that I, CHARLES A. REED, a citizen of the United States of America, and resident of the town of Onalaska, in the county of Lewis and State of Washington, have invented certain new and useful Improvements in Fluid Distributors, of which the following is a specification.

My invention relates to distributing mechanism intended for controlling the application of fluids to any one of several mechanisms.

The object of my invention is to provide a simple and effective mechanism whereby fluids under pressure may be selectively distributed to any one of a series of other mechanisms for their operation.

My invention consists of the parts and combinations thereof hereafter described and particularly pointed out in the claims.

In the accompanying drawings I have shown a preferred embodiment of my invention.

Figure 1 is a section through the distributing valve, taken upon an axial plane thereof.

Figure 2 is a top or plan view of the same mechanism, and Figure 3 is a diagram representing the application of my invention to apparatus of a certain type.

My invention employs a selector valve and a control valve mounted together in such way that they are joined in different relationship so far as position goes, and operating mechanisms whereby the selector valve may be moved into the desired position and the control valve then be operated to admit or discharge fluid under pressure from the mechanism which is to be controlled thereby.

In the form of construction of the selector valve illustrated, a casing 1 is employed in which is mounted the selector valve proper. This selector valve is in the form of a disk 10, having one face thereof in close contact with the bottom face of the casing 1. This bottom face of the casing 1 serves as a valve seat and has therein a series of ports 11, circularly disposed and adapted to be connected as by pipes 13 with the various mechanisms which are to be operated by the fluid controlled by the selector valve. The valve 10 has a single port 12 therein, positioned to register with any one of the ports 11 in the casing. A cover plate, as 14, serves to enclose the casing and form a chamber to which the fluid under pressure is admitted.

The valved disk 10 is provided with an axis or journal 2 which extends through a hole in the cover plate 14. This stem or axis is provided with a port 20 extending lengthwise thereof for a sufficient distance to connect the chamber in the casing 1 with the radially disposed tubular arm 3 which extends from the stem outside of the casing. A radial opening 21 connects this axial port with the chamber in the casing 1.

The control valve 4 is of cylindrical shape and mounted to reciprocate in the tubular arm 3. As illustrated the inner portion of this valve is tubular, having an axial bore 40. It is also provided with ports as 41 and 42, placed at different points in the length thereof and adapted to be brought one at a time in registry, one, the port 41, with the port 30 in the arm 3, and the other, the port 42, with a port 31 in the arm 3. Ports 30 and 41 when brought into registry serve as exhaust ports, while ports 42 and 31 when brought into registry serve as supply ports. The port 31 in the arm 3 is connected as by a pipe 6 with an axial bore 22 in the outer end of the axis 2 of the disk or distributing valve 10. This is connected as by a pipe 60 with any source of supply or other operating fluid under pressure.

Pivoted upon the outer end of the arm 3 is a controlling handle or lever 5. This has an arm 50, illustrated in the drawings as being of yoke-shape, and provided with slots 51 which receive a pin 43 carried by the outer end of the control valve 4. It is evident that by swinging the lever 5 upon its pivot, the control valve 4 will be reciprocated in its guiding arm 3. In this manner the port 42 may be brought into registry with the port 31 to supply fluid under pressure to the distributing chamber of the distributing valve or to bring the ports 41 into registry with the ports 30 and thus to exhaust the air from the distributing chamber and also from the mechanism which at the time may be connected therewith. At the same time the controlling lever 5 has a slight projection or rib as 52, which is adapted to be engaged with any one of a series of notches, as 15, carried by the outer edge of the plate 14 which forms the cover for the distributing chamber. These notches are so positioned that when the controlling lever is engaged therewith, the distributing valve 10 is in position to have its port 12 register with one of the ports with which the distributing pipes 13 are connected.

When the control lever is thus engaged with the cover plate 14, the source of supply of fluid under pressure is in free communication with one of the distributing pipes 13. When, however, the control lever 5 is thrown upward so as to disengage it from the cover plate 14 and to thereby permit free turning of the distributing valve 10, then the ports 42 and 31 are in communication and the distributing valve is in free communication with the outside air so as to exhaust whatever fluid may be contained therein.

In Figure 3 is illustrated the manner in which the distributing valve is connected with a series of mechanisms to be controlled thereby. In this figure, 7 indicates a series of cylinders and pistons which are to be actuated through the admission of fluid under pressure thereto. This may consist of a series of stops designed to engage and stop a piece of lumber as 9 in definite position to be trimmed as to length, by cut-off saws as 8.

While the distributing valve is especially for use in trimming lumber, it is evident that it may be used in connection with other mechanisms. I do not wish to be understood, therefore, as limiting it to this particular use.

What I claim as my invention is:

1. A rotatively-mounted disk-like distributing valve having a single port passing therethrough, a casing for said valve having a series of distributing ports in one face adapted to register with the port in the valve, an operating journal for said valve extending without the casing and having a fluid port therein, an operating arm connected with said journal, and a control valve mounted to control said fluid port to connect it with the source of supply and with an exhaust at will.

2. In a fluid distributor, a casing having a series of circularly disposed discharge outlets adapted to be connected with the various distribution points, a disk rotatively mounted in the casing and having a ported axial stem extending without the casing, said disk having a single port adapted to register with the discharge outlets of the casing, a tubular arm extending radially from the axial stem of the disk, and having non-registering supply and discharge ports in its sides, a control valve reciprocable in said arm and a control handle pivoted upon said arm and connected with the control valve to operate it.

Signed at Onalaska, Lewis County, Washington, this 12th day of August 1925.

CHARLES A. REED.